United States Patent [19]

Durand

[11] Patent Number: 5,681,026
[45] Date of Patent: Oct. 28, 1997

[54] SOLENOID VALVE AND MASSAGE APPARATUS EMPLOYING SUCH A SOLENOID VALVE

[75] Inventor: Jacques Durand, Bourg Les Valence, France

[73] Assignee: LPG Systems, Valence, France

[21] Appl. No.: 592,425

[22] PCT Filed: Oct. 6, 1994

[86] PCT No.: PCT/FR94/01167

§ 371 Date: Feb. 6, 1996

§ 102(e) Date: Feb. 6, 1996

[87] PCT Pub. No.: WO95/09596

PCT Pub. Date: Apr. 13, 1995

[30] Foreign Application Priority Data

Oct. 7, 1993 [FR] France .................. 93/12151

[51] Int. Cl.$^6$ .................................................. F16K 31/06
[52] U.S. Cl. .................. 251/129.16; 251/129.05; 251/129.21
[58] Field of Search ............... 251/129.15, 129.05, 251/129.17, 129.21, 129.16, 129.07

[56] References Cited

U.S. PATENT DOCUMENTS 4,729,368  3/1988  Guitay .
5,158,263  10/1992  Shimizu et al. ............. 251/129.17 X

FOREIGN PATENT DOCUMENTS 0224422  6/1987  European Pat. Off. .
0318789  11/1988  European Pat. Off. .
3133060  8/1980  Germany .

*Primary Examiner*—Kevin Lee
*Attorney, Agent, or Firm*—Harris Beach & Wilcox, LLP

[57] ABSTRACT

Adjustable flow electromagnetic valve having a closing assembly (8) movable within a chamber (7) with a passage (3) linked to a high pressure area and a passage (4) linked to a low pressure area. The electromagnetic valve is designed such that the closing assembly consists of a valve (8) freely movable within the chamber (7). The disk-shaped valve (8) is flat, light and non-deformable and is capable of being automatically brought to its fluid flow position when pressure within the inlet passage (HP) (5) tends to a value approaching a predefined set pressure; the electromagnetic valve is also designed such that fluid flow through the valve (8) is achieved by openings (10) formed in the thickness of the valve, the openings being arranged in a median area outside the circumference of the inlet passage (3) so that the latter can be closed when the valve (8) is electromagnetically returned. It is further characterized by adjusting the electromagnetic return force exerted by the electromagnet for placing the valve (8) at a predetermined point between opening and closing to provide a predetermined constant flow, and for alternately shifting it, according to a predetermined frequency, to provide an adjustable alternating flow of the same frequency and of variable amplitude, resulting in sequential, pulsed, rhythmic operation.

8 Claims, 2 Drawing Sheets

SOLENOID VALVE AND MASSAGE APPARATUS EMPLOYING SUCH A SOLENOID VALVE

BACKGROUND OF THE INVENTION

The present invention relates to a novel type of solenoid valve which can be used to connect two circuits maintained at different pressures in order to ensure flow of a fluid (liquid or gaseous) from a high pressure zone to a low pressure zone.

It more particularly concerns a novel type of solenoid valve whose design is such that it makes it possible to obtain equally well:

all or nothing operation (circulation of the fluid at a maximum flow rate when it is open/shutoff of the circulation when it is closed), a constant flow rate that can be adjusted between the aforementioned extremes, and dynamic operation, leading to a controlled variable flow rate of the air flow between two predetermined parameters, with the possibility of adjustment between said values.

In the rest of the description, the invention will be described with reference to a solenoid valve interposed on the length of a circuit, one end of which is open to the outside air, the high pressure at the inlet of said circuit then being equivalent to atmospheric pressure, and the outlet of which is connected, for its part, to a suction system (vacuum pump) therefore corresponding to the low pressure circuit of the assembly.

It is clear that this does not imply any limitation, and that a valve of such type could be interposed on any type of circuit including a high pressure inlet, regardless of its value, and an outlet at a lower pressure.

Conventional solenoid valves of this type essentially including a plunger subjected to the action of return means (springs) and whose displacements, optionally controlled pneumatically and making it possible to interrupt or allow the passage of a fluid flow between an inlet circuit and a discharge circuit at a lower pressure, are not suitable for solving such a problem. This is because, these solenoid valves in general require heavy cores resulting in high inertia. They are furthermore difficult to use on low pressure circuits for which it is also desired to obtain a high flow rate, while having a very short response time of the order of a few milliseconds. They are furthermore designed to ensure a predetermined flow rate, which requires the use of a plurality of solenoid valves that can be controlled independently of each other, when it is desired to adjust this flow rate.

Variable flow solenoid valves also exist, but they are not suitable when it is desired to obtain high flow rates and to have short response times, making it possible to vary the flow rate of a fluid between two zones subjected to different pressures rapidly and at a frequency which may be variable.

In order to open and close a solenoid valve, it was long ago proposed, as disclosed by Patents U.S. Pat. No. 3,758,071, GB-A-2 124 342 and DE-A-3 133 060, to use a closure assembly which can be moved inside a chamber connecting two circuits maintained at different pressures and can, under the action of an electromagnetic force, close the inlet (or the outlet) of one of the circuits when it is decided to cut the flow and which, in the absence of an electromagnetic force, is returned toward the outlet (or inlet) of the second circuit, but without closing it, so that a continuous flow of fluid is obtained in this position.

However, no solution described in these documents makes it possible to envisage production of a solenoid valve having the operational possibilities as summarized in the preamble and which therefore leads not only to the possibility of having high, adjustable fluid flow rates but also to the possibility of having dynamic operation requiring a very short response time, of the order of a few milliseconds, making it possible to have a controlled variable flow rate of the air flow between two predetermined mined values with the possibility of adjustment between said values.

SUMMARY OF THE INVENTION

A novel type of solenoid valve has now been found, which has a particularly simple design and makes it possible to solve all these problems, and it is this solenoid valve that constitutes the subject matter of the present invention.

In general, the invention therefore relates to a variable flow solenoid valve, without return spring, which allows connection of two circuits maintained at different pressures, in order to ensure flow of a fluid from a high pressure zone to a low pressure zone, of the type comprising:

a casing, advantageously of cylindrical shape, constituting a chamber into which opens a conduit called the "inlet conduit" connected to the high pressure zone, and a conduit called the "outlet conduit" connected to the low pressure zone;

a closure assembly that can be moved inside said chamber and which:

under the action of an electromagnetic force, tends to close the orifice of the inlet conduit, in the absence of an electromagnetic force, is returned toward the outlet conduit (BP) and does not close the entry of the latter so as to obtain, in this position, a continuous flow of the fluid with a maximum flow rate maintained at a predetermined level that is a function of the pressure difference between the high pressure zone and the low pressure zone and the possible pressure drop.

In the solenoid valve according to the invention:

the closure assembly consists of a flap valve that can be moved freely inside the chamber, which flap valve is in the form of a nondeformable lightweight flat disk that can be returned automatically into its position permitting the fluid to flow when the pressure inside the inlet conduit tends toward a value close to a predetermined set pressure;

the flow of the fluid through said flap valve is obtained by means of orifices made in the thickness of the latter, which orifices are arranged in a central zone outside the periphery of the inlet conduit, so that the latter can be closed when the flap valve is returned under the action of the electromagnetic force;

means are included for adjusting the electromagnetic return force exerted by the electromagnet, allowing said valve, on the one hand, to be positioned at a predetermined level between opening and closure in order to obtain a constant predetermined flow rate and, on the other hand, to be moved in alternation, at a predetermined frequency, thus allowing an alternating flow rate of the same frequency and of adjustable amplitude to be obtained, leading to sequential, pulsed and rhythmic operation.

According to a preferred embodiment of the invention, the total cross section of the orifices made in the thickness of the flap valve is substantially equal to the cross section of the inlet and outlet conduits, said conduits being arranged coaxially on either side of the chamber inside which the flap valve can move.

In addition, the imaginary surface defined by the extension of the high pressure conduit and which ends against the flap valve when the latter is not subjected to the action of the electromagnetic force, through which all the air flow passes, has an area substantially equal to the cross section of the inlet and outlet conduits.

Furthermore, the flap valve is advantageously based on a nonmagnetizable material (soft iron, for example), and its active surface is preferably covered with a coating of material having low magnetic permeability, creating a gap when the flap valve is in the closed position.

Finally, the solenoid valve preferably includes an integrated filter inside the casing and through which the fluid passes before it enters the inlet conduit.

By virtue of the clearly specified features both of the fluid circuit inside the solenoid valve and of the magnetic circuit, it is possible to obtain not only a high fluid flow rate but also to have a very short response time (of the order of a few milliseconds), to which the low mass of the flap valve contributes.

Such a design also avoids jolting phenomena and makes it possible to obtain a low sound level.

Such a solenoid valve is particularly suited to be used on any type of apparatus where it is desired to obtain an adjustable and/or variable fluid flow rate (air circulation creating suction at the inlet of the apparatus) and, more particularly, on massage apparatuses of the type described in European Patent 224 422.

In such an application, the use of a solenoid valve according to the invention not only makes it possible to produce massage of the conventional "kneading-rolling" type, it being possible to keep the suction rate constant at a predetermined level, if so desired, throughout the massage phase, but also offers the possibility of producing in a simple fashion a "sequential, pulsed, rhythmic" operation such that, during the massage operation, the suction rate varies cyclically, thus making it possible to combine a conventional "kneading-rolling" massage operation, where the suction phenomenon and the take-up of the skin fold is kept at a constant level, with a phase during which the suction decreases progressively to reach a predetermined minimum value, after which it returns progressively to a maximum value, also predetermined, thus causing an effect of "vibration" and of variation of the suction force and of the take-up of the skin fold, thus improving the efficiency of this technique and also allowing easier use of the apparatus on the patient.

Indeed, in such an application, as a function of the frequency and duration of activation of the electromagnetic source, it is possible to obtain an alternation of two flow rate phases, which can be altered at will, one during which the apparatus ensures a constant suction rate kept at a predetermined level (electromagnet off), and the other, when the electromagnet is actuated and therefore closes the conduit connected to the high pressure zone, during which the flow rate (and therefore the suction rate) decreases progressively and could reach a zero threshold when the circuit reaches the external pressure (atmospheric pressure). When a value close to the high pressure value is reached, either the action of the electromagnet is stopped, so as to return the closure disk into a position such that the air can flow normally through the entire circuit under the action of the low pressure zone, or the return force exerted by the electromagnet is fixed at a value such that it is greater than that exerted by the low pressure zone, but less than that exerted by the high pressure zone, which allows movement and reciprocating displacement of the flap valve in the chamber and periodic closure of the solenoid valve.

It should be noted that, by virtue of such a solenoid valve, it is also possible, by simply adjusting the return force exerted by the electromagnet, to ensure movement of the valve such that it simply comes into proximity to the orifice connected to the high pressure zone, without closing the latter, making it possible to ensure an adjustable constant flow rate.

BRIEF DESCRIPTION OF THE DRAWINGS

The invention and the advantages which it provides will, however, be better understood by virtue of the exemplary embodiment given below by way of indication but without implying any limitation, and which is illustrated by the appended diagrams, in which.

DESCRIPTION OF THE INVENTIONS

Figure 1:
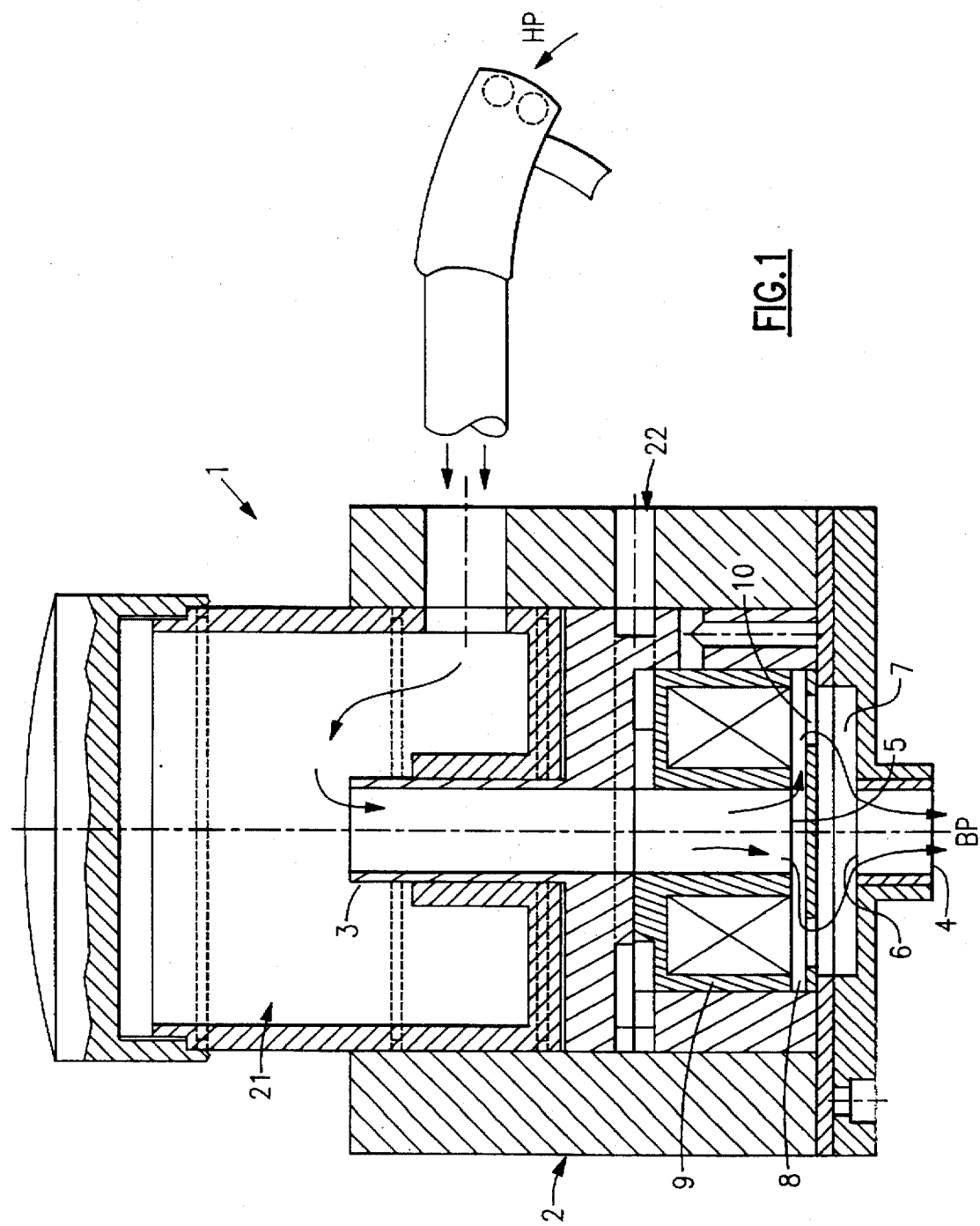
FIG. 1 is a view in elevation and in section, substantially on unit scale, of a solenoid valve produced according to the invention.
Figure 2:
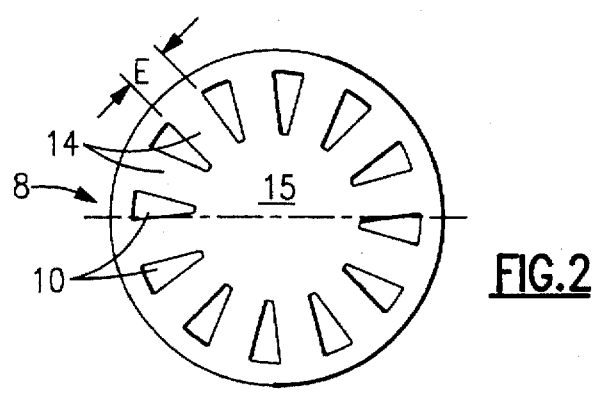
FIG. 2 is a plan view illustrating the particular structure of the flap valve which includes a solenoid valve according to the invention.
Figure 3:
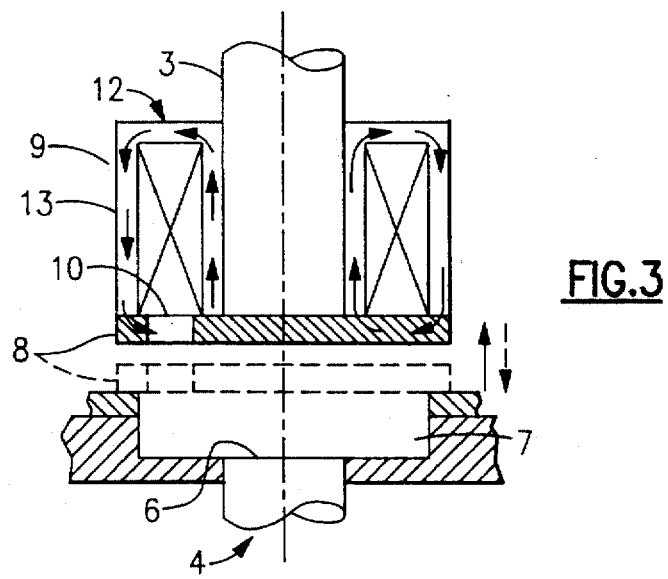
FIG. 3 is a detailed view of FIG. 1, illustrating the magnetic circuit and the movements of the flap valve for opening and closing the solenoid valve.

Referring to FIGS. 1 to 3, the solenoid valve according to the invention, which is denoted by the general reference (1), is in the form of a cylindrical assembly interposed between two circuits (HP) and (BP).

The fluid circuit inside the solenoid valve takes place through an assembly including a conduit (3) called the "inlet" conduit and a conduit (4) called the "outlet" conduit which is connected to the low pressure zone, the outlet (5) of the inlet conduit and the entry (6) of the outlet conduit opening in a chamber (7) inside which a closure assembly (8) is arranged, which, under the action of an electromagnetic force created by an electromagnet (9) tends to close the outlet (5) and which, in the absence of an electromagnetic force, is returned toward the entry (6) of the outlet conduit without closing it, so that, in this position, a continuous flow of fluid is obtained with a maximum flow rate kept at a predetermined level that is a function of the pressure difference between the high pressure zone (HP) and the low pressure zone (BP) and of the possible pressure drop.

It should be noted that, in the embodiment illustrated in the appended figures, the solenoid valve according to the invention is produced so that it can be dismantled easily and such that it includes a filter (21) integrated on the inlet circuit.

According to the invention, and emerges clearly in the appended figures, and so that such a solenoid valve can not only allow high fluid flow rates, which may be up to 25 m3/h or more, while allowing very short response times (of the order of a few milliseconds), the air circuit inside the solenoid valve, the structure of the closure element and the features of the magnetic circuit have been defined very specifically, namely essentially that the closure assembly (8) consists of a flap valve which can be moved linearly inside the chamber (7) and which is in the form of a nondeformable light-weight flat disk which can be returned automatically into its position allowing the fluid to flow when the pressure inside the inlet conduit (3) tends toward a value close to a predetermined set pressure, the flow of fluid through said flap valve being obtained by means of orifices (10) produced in its thickness, which orifices are arranged in a central zone outside the periphery of the inlet conduit (3), so that the latter can be closed when the flap valve is returned under the action of the electromagnetic force created by the electromagnet (9).

In order to ensure a high flow rate, the total cross section of the orifices (10) produced in the thickness of the flap valve, is substantially equal to the cross section of the inlet (3) and outlet (4) conduits, said conduits being, in addition, arranged coaxially on either side of the chamber (7) inside which the flap valve can move.

In addition, in order to obtain such a high fluid flow rate and have a very short response time when the electromagnet (9) is excited, the movements of the flap valve inside the chamber (7) will be of the order of a few millimeters with respect to the outlet (5) of the inlet conduit. The value of these movements can be determined by considering that the imaginary surface defined by the extension of the inlet conduit (3) and which ends against the flap valve when the latter is not subjected to the action of the electromagnetic force and through which all the air flow therefore passes, should have an area substantially equal to the cross section of the inlet (3) and outlet (4) conduits. If the area of the surface is equal to the product of the excursion of the flap valve multiplied by the internal circumference of the latter, it is possible, knowing the cross section of the conduit, to determine the maximum value of the movement: below this value, a constriction of the fluid circuit, and consequently a flow rate loss, is produced, while above it, there is no improvement in terms of flow rate and a loss of return speed of the flap valve, which requires the use of a more powerful coil in order to close the valve.

By way of indication, in the exemplary embodiment illustrated in the appended figures and in which the diameter of the conduits (3) and (4) is 14 mm, with a flap valve having a thickness of 2 mm, the amplitude of the movement of the latter in the chamber (7) will be 2 mm and weighing 20 grams, which makes it possible to ensure a fluid flow rate of up to 25 m3/h, while allowing virtually instantaneous return of the flap valve under the action of the electromagnet.

By way of indication, such a solenoid valve has the general feature of having a power of 2.5 watts, a closure time of the order of 10 milliseconds and allows, when it is open, a fluid flow rate of the order of 25 m3/h.

In addition, in order to have correct operation of the coil, it is expedient to have a constant cross section along the path of the magnetic field which, as is represented in FIG. 3, passes through the central column (11) then the end face (12) and finally the external column (13). In order to do this, it is necessary to have an equal field conduction surface area, which is obtained by having equal cross sections in the central column (11) and the external column (13), the central column (11) therefore being thicker than the external column (13).

In addition, passage of the magnetic field through the flap valve (8) should take place through a surface area identical to the surface areas of the fixed equipment of the electromagnet. Consequently, as is seen from FIG. 2, the orifices (10) created in the flap valve (8) and allowing the fluid to flow have a shape such that they define bars (14) of constant width (E) between them. In addition, in view of the fact that the magnetic field passes through the disk only over the length of the bars (14), it is possible to envisage having a thinner central zone (15) which closes the outlet orifice (5), thus making it possible to decrease the mass of the flap valve.

Finally, according to the invention, and in order to have fast opening and practically instantaneous displacement of said flap valve by the air flow when the supply to said coil is cut, said flap valve is preferably made of a nonmagnetizable material, for example of soft iron, which has a very small remanent field. Consequently, as soon as the magnetic field is cut, there is no force to retain the flap valve, which is therefore displaced practically instantaneously by the air flow.

In order to decrease to the remanent field further, it is necessary to limit the magnetic field.

Such a limitation of the field can be obtained by the action of a gap formed, for example, by a seal at the outlet (5) of the inlet conduit. Such a seal may consist of a coating layer on the flap valve (for example paint). This gap also makes it possible to avoid iron-on-iron friction and to decrease wear considerably.

Figure 4:
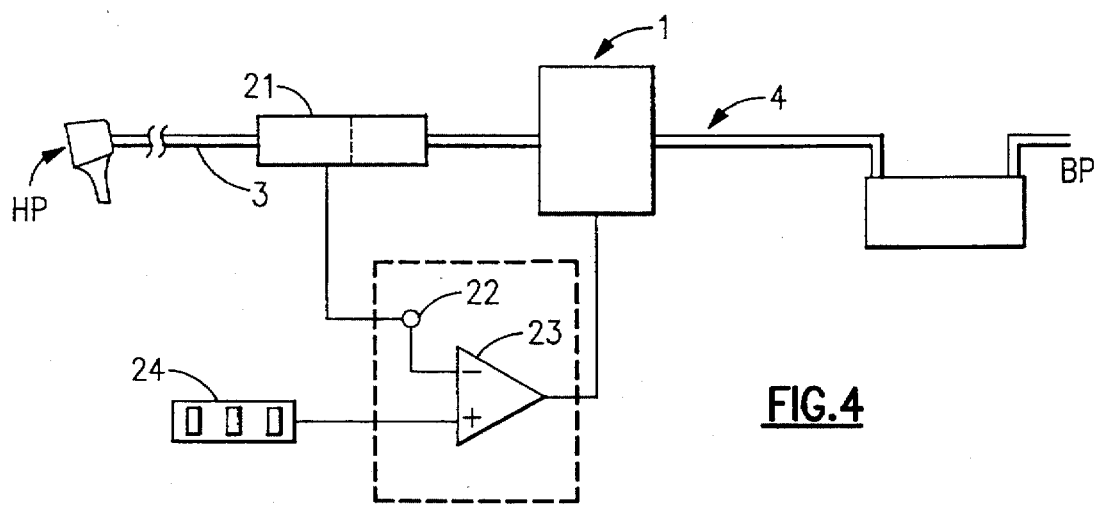
FIG. 4 is a schematic diagram illustrating the set of means making it possible to actuate and control a massage apparatus employing a suction phenomenon by means of a solenoid valve according to the invention.

FIG. 4 schematically illustrates the application of a solenoid valve used according to the invention on a massage apparatus employing a pneumatic suction phenomenon, and more particularly a massage apparatus produced according to the teachings of European Patent 224 422. By way of indication, for such massage units, it is necessary to be able to adjust the flow rate as a function of the treatments which are carried out, which flow rate may be as high as 25 m3/h.

To date, and as emerges more particularly from European Patent 224 422 (see FIG. 6), a plurality of solenoid valves referenced (34) is used to adjust the flow rate, this set of solenoid valves being replaced by a single solenoid valve produced according to the invention and which makes it possible to obtain not only all or nothing operation between a maximum flow rate when the solenoid valve is open, and shutoff of the fluid circulation when it is closed, as well as a constant flow rate that is adjustable between the two aforementioned extremes, which was obtained previously by the plurality of solenoid valves included in such units, but also dynamic operation leading to a variable flow rate, against said air flow between two predetermined values with the possibility of adjustment between said values.

In such an application, the solenoid valve (1) is therefore interposed on the circuit connecting the massage head (HP) to a vacuum pump (20), thus defining a high pressure inlet circuit (3) (HP) and a low pressure circuit (4) (BP). A filter (21) intended to prevent the vacuum pump (20) from sucking in dust, is mounted on the circuit (5).

The assembly is associated with means that program the degree of suction at the entry of the massage head and maintain the suction at a predetermined value as well as the setting duration.

Such means essentially consist of an adjustment and control assembly, comprising a pressure sensor (22) mounted in bypass on the circuit (3), the solenoid valve control circuit (1) comprising a comparator (23) (or differential amplifier) which receives two input information items, namely:

the set signal obtained from a value programed on the control panel (24) for the pressure reduction value;

the actual signal obtained from the electrical information delivered by the pressure sensor (22) mounted on the pneumatic circuit (3).

It should be noted that, in the solenoid valve according to the invention, the filter (21) is integrated actually inside the solenoid valve body, and the sensor (22) also detects the pressure inside the inlet conduit (3).

By virtue of a solenoid valve according to the invention, it is possible to program the massage operation in order to obtain suction having a predetermined value for a period of time which is also predetermined, when the electromagnet (9) returning the flap valve (8) is not excited and said flap valve is therefore held away from the outlet (5) of the inlet conduit (3). Air therefore flows freely between the conduits (3) and (4) through the orifices in the flap valve.

When it is desired to vary the suction rate at the inlet of the massage head, the electromagnet (9) is excited and as a result of a flap valve (8) tends to close the outlet (5) of the conduit (3). This therefore leads to a progressive rise in the pressure inside the conduit (3) up to a value tending to approach the high pressure value (atmospheric pressure) prevailing outside the apparatus. When this pressure reaches a maximum predetermined threshold, corresponding to a minimum suction rate of the massage head, which pressure is monitored by the sensor (22), the supply to the electromagnet is cut and the flap valve (8) is automatically pushed back inside the chamber (7), thus allowing air to flow through the entire circuit.

By exciting the electromagnet (9) at a specific frequency, a rhythmic and alternating movement of the flap valve (8) between the outlet of the inlet conduit (3) and its extreme position inside the chamber (7) is obtained, causing a suction vibration phenomenon at the inlet of the massage head.

It is also possible to maintain the flap valve (8) in a specific intermediate position solely by means of the magnetic force exerted on the flap valve.

In fact, the stronger the magnetic field, the greater the magnetic force. At the same time, the smaller the gap, the stronger the magnetic field. In other words, the nearer the flap valve (8) comes to the outlet (5) of the inlet conduit, the stronger the magnetic force.

In addition, along the thin airstream passing over the surface between the flap valve (8) and the opening of the conduit (5), forces due to friction of air against the walls occur, and have a tendency to push the flap valve back. Consequently, the thinner the air stream, the greater the pressure difference between the high pressure zone and the low pressure zone, and therefore the higher the air friction forces. These phenomena therefore make it possible to keep the flap valve in a specific intermediate position, because slight perturbations of equilibrium, for example movement of the flap valve (8) closer, result in an increase in the attractive magnetic force which is compensated for by an increase in the repulsive fluid force. Such a possibility therefore makes it possible to ensure a constant flow rate that can be adjusted simply by adjusting the return force exerted by the electromagnet (9).

Finally, in such an application, as a function of the frequency and duration of activation of the electromagnetic source, it is possible to obtain an alternation of two flow rate phases, which can be altered at will, one during which the apparatus ensures a constant suction rate kept at the predetermined level, and the other, when the electromagnet (9) is actuated and therefore closes the conduit (3) connected to the high pressure zone (HP), during which the flow rate (the suction rate) decreases progressively and could reach a zero threshold when the circuit reaches the external pressure (atmospheric pressure). When a value close to the high pressure value is reached, either the electromagnet is stopped so as to return the closure disk into a position such that air can flow normally through the entire circuit under the action of the low pressure zone, or the return force (FM) exerted by the electromagnet is fixed at a value such that it is greater than that exerted by the low pressure zone but less than that fixed by the high pressure zone, which allows reciprocating displacement of the flap valve in the chamber and closure of the solenoid valve, making it possible to obtain dynamic operation.

The solenoid valve according to the invention, of particularly simple design, which allows a high flow rate, makes it possible to obtain very short response times, can be used in all cases where it is desired to vary, very rapidly and at a frequency which may also be variable, the flow rate of a fluid between two zones subjected to different pressures. It can be used in all cases when it is desired to produce controlled adjustment from the high pressure zone to a low pressure zone. Thus, such a solenoid valve can be used to carry out a fluid (water or air) jet treatment instead of a suction. In such a case, the suction massage head described in the application example given above would be replaced by a booster pump which would deliver the fluid (air or water) always in the same direction, the valve regulating in the same way, said fluid then being expelled on the low pressure zone side, at the outlet of which a nozzle or treatment head would then be arranged.

I claim:

1. An adjustable flow solenoid valve, which operates without a return spring, allowing connection of two circuits maintained at different pressures, in order to ensure flow of a fluid from a high pressure zone (HP) to a low pressure zone (BP), of the type comprising:

a casing (2) constituting a chamber (7) into which opens an inlet conduit (3) having an orifice connected to the high pressure zone (HP), and an outlet conduit (4) connected to the low pressure zone (BP);

a closure assembly that can be moved inside said chamber and which:

under the action of an electromagnetic force, tends to close the orifice (5) of the inlet conduit (3), in the absence of the electromagnetic force, is returned toward the outlet conduit (4) and does not close the entry of the outlet conduit so as to obtain, in this position, a continuous flow of the fluid with a maximum flow rate maintained at a predetermined level that is a function of the pressure difference between the high pressure zone (HP) and the low pressure zone (BP) and the pressure drop, such that in the absence of the electromagnetic force:

the closure assembly consists of a flap valve (8) that can be moved freely inside said chamber (7), which flap valve is in the form of a nondeformable lightweight flat disk that can be returned automatically into its position permitting the fluid to flow when the pressure inside the inlet conduit (5) tends toward a valve close to a predetermined set pressure;

the flow of the fluid through the flap valve (8) is obtained by means of orifices (10) made in the thickness of the flap valve, which orifices are arranged in a central zone outside the periphery of the inlet conduit (3), so that the inlet conduit can be closed when the flap valve (8) is returned under the action of the electromagnetic force;

means are included for adjusting the electromagnetic return force exerted by the electromagnet, allowing said valve (8), on the one hand, to be positioned at a predetermined level between opening and closure in order to obtain a constant predetermined flow rate and, on the other hand, to be moved in alteration, at a predetermined frequency, thus allowing an alternating flow rate of the predetermined frequency and of an adjustable amplitude of flow to be obtained, leading to sequential, pulsed and rhythmic operation.

2. The solenoid valve as claimed in claim 1, wherein the total cross section of the orifices (10) made in the thickness of the flap valve is substantially equal to the cross section of the inlet (3) and outlet (4) conduits, said conduits being arranged coaxially on either side of the chamber inside which the flap valve can move.

3. The solenoid valve as claimed in claim 2, having an imaginary surface defined by an extension of the high pressure conduit (HP) ending against the flap valve when the flap valve is not subjected to the action of the electromagnetic force, through which all the air flow passes, has an area substantially equal to the cross section of the conduits (4) or (5).

4. The solenoid valve as claimed in claim 1, wherein the flap valve (8) is based on a non-magnetizable material.

5. The solenoid valve as claimed in claim 4, having an active surface of the flap valve (8) which is covered with a coating of material having low magnetic permeability, creating a gap when the flap valve is in the closed position.

6. The solenoid valve as claimed in claim 1, which includes an integrated filter (21) through which the fluid passes before it enters the inlet conduit (3).

7. A massage apparatus having a head connected by a circuit to a vacuum pump (20), for exerting a suction force on a patient, the massage apparatus having an adjustable flow solenoid valve, which operates without a return spring, allowing connection of two circuits maintained at different pressures, in order to ensure flow of a fluid from a high pressure zone (HP) to a low pressure zone (BP), of the type comprising:

a casing (2) constituting a chamber (7) into which opens an inlet conduit (3) having an orifice connected to the high pressure zone (HP), and an outlet conduit (4) connected to the low pressure zone (BP);

a closure assembly (8) that can be moved inside said chamber and which:
under the action of an electromagnetic force, tends to close the orifice (5) of the inlet conduit (3),
in the absence of the electromagnetic force, is returned toward the outlet conduit (4) and does not close the entry of the outlet conduit so as to obtain, in this position, a continuous flow of the fluid with a maximum flow rate maintained at a predetermined level that is a function of the pressure difference between the high pressure zone (HP) and the low pressure zone (BP) and the pressure drop, such that in the absence of the electromagnetic force:

the closure assembly consists of a flap valve (8) that can be moved freely inside said chamber (7), which flap valve is in the form of a nondeformable lightweight flat disk that can be returned automatically into its position permitting the fluid to flow when the pressure inside the inlet conduit (5) tends toward a valve close to a predetermined set pressure;

the flow of the fluid through the flap valve (8) is obtained by means of orifices (10) made in the thickness of the flap valve, which orifices are arranged in a central zone outside the periphery of the inlet conduit (3), so that the inlet conduit can be closed when the flap valve (8) is returned under the action of the electromagnetic force;

means for adjusting the electromagnetic return force exerted by the electromagnet, such that it is possible to selectively prevent the flow of fluid and to allow a flow rate that can be adjusted to a predetermined fixed valve, and also allow a controlled rate of flow of the air between two predetermined values, with the possibility of adjustments between said values, this being such as to obtain an alternation, of variable frequency, of two phases, one during which the fluid flow rate is maintained at a constant value corresponding to a predetermined set pressure, therefore creating suction which is also of constant intensity when the flap valve (8) is not subjected to the action of the electromagnetic force, and a phase during which the air flow rate through the massage head decreases progressively to a minimum value when the flap valve (8) is returned under the action of the electromagnetic force.

8. The massage apparatus as claimed in claim 7, wherein the head has a structure such that the apparatus can to produce massage of a "kneading-rolling" type with or without rhythmic effect.

* * * * *